US011931773B1

United States Patent
Abro et al.

(10) Patent No.: US 11,931,773 B1
(45) Date of Patent: Mar. 19, 2024

(54) TUNABLE EXTERIOR PAINT COLOR

(71) Applicant: TOYOTA MOTOR ENGINEERING & MANUFACTURING NORTH AMERICA, INC., Plano, TX (US)

(72) Inventors: Lauren M. Abro, West Bloomfield, MI (US); Yuko N. Gidcumb, West Bloomfield, MI (US); Michelle R. Vargo, Plymouth, MI (US); Lindsay A. Babian, Canton, MI (US)

(73) Assignees: Toyota Motor Engineering & Manufacturing North America, Inc., Plano, TX (US); Toyota Jidosha Kabushiki Kaiha (JP)

( * ) Notice: Subject to any disclaimer, the term of this patent is extended or adjusted under 35 U.S.C. 154(b) by 10 days.

(21) Appl. No.: 17/964,733

(22) Filed: Oct. 12, 2022

(51) Int. Cl.
| | | |
|---|---|---|
| B05D 3/06 | (2006.01) | |
| B05D 3/02 | (2006.01) | |
| B05D 5/06 | (2006.01) | |
| C09D 5/32 | (2006.01) | |
| H04B 10/50 | (2013.01) | |
| H04B 10/516 | (2013.01) | |
| H04B 10/564 | (2013.01) | |
| H05B 1/02 | (2006.01) | |

(Continued)

(52) U.S. Cl.
CPC .............. *B05D 3/06* (2013.01); *B05D 3/0254* (2013.01); *B05D 5/065* (2013.01); *C09D 5/32* (2013.01); *H04B 10/505* (2013.01); *H04B 10/516* (2013.01); *H04B 10/564* (2013.01); *H05B 1/023* (2013.01); *H05B 47/175* (2020.01); *B05D 7/14* (2013.01)

(58) Field of Classification Search
None
See application file for complete search history.

(56) References Cited

U.S. PATENT DOCUMENTS 4,917,643 A * 4/1990 Hippely ................. A63H 17/26
446/14
8,421,811 B2 * 4/2013 Odland ..................... G09F 9/33
345/589

(Continued)

FOREIGN PATENT DOCUMENTS

CN 108559417 A 9/2018
CN 111171701 A 5/2020

(Continued)

OTHER PUBLICATIONS

"BMW debuts its new color-changing paint technology at CES: E Ink"; Hawkins, Jan. 5, 2022, https://www.theverge.com/2022/1/5/22867090/bmw-color-changing-paint-electric-car-ces.*

(Continued)

*Primary Examiner* — Jonathan M Dager
(74) *Attorney, Agent, or Firm* — SNELL & WILMER LLP

(57) ABSTRACT

The systems and methods utilize thermal energy linked to certain colors vehicles may be manufactured in a single color and changed to a specific color at a dealership before customer purchase and/or throughout the lifetime of the vehicle. A system for modulating vehicle paint of a vehicle includes a paint layer disposed on an exterior surface of the vehicle and a color modulator configured to radiate a light such that the paint layer reacts when the paint layer is exposed to the light.

18 Claims, 5 Drawing Sheets

(51) Int. Cl.
*H05B 47/175* (2020.01)
*B05D 7/14* (2006.01)

(56) References Cited

U.S. PATENT DOCUMENTS

| | | | | |
|---|---|---|---|---|
| 8,569,208 | B1* | 10/2013 | Ribi | G01N 31/222 |
| | | | | 503/201 |
| 10,168,307 | B1* | 1/2019 | Ribi | G01N 31/229 |
| 11,046,243 | B2* | 6/2021 | Kumar | B60Q 1/54 |
| 11,654,821 | B1* | 5/2023 | Durairaj | B60Q 1/46 |
| | | | | 701/1 |
| 2006/0116442 | A1* | 6/2006 | Gallo | C09D 5/26 |
| | | | | 524/80 |
| 2009/0074994 | A1* | 3/2009 | McLean | B60R 13/04 |
| | | | | 428/31 |
| 2020/0078809 | A1* | 3/2020 | Hirano | B05B 16/95 |
| 2022/0008947 | A1* | 1/2022 | Tani | B05B 5/08 |
| 2022/0049103 | A1* | 2/2022 | Kambe | C09D 11/037 |
| 2023/0016917 | A1* | 1/2023 | Il | G06Q 10/20 |
| 2023/0152651 | A1* | 5/2023 | Sargent | G02F 1/167 |
| | | | | 359/275 |

FOREIGN PATENT DOCUMENTS

| | | | | |
|---|---|---|---|---|
| CN | 112724854 | A | 4/2021 | |
| DE | 102006003634 | A1 | 7/2007 | |
| EP | 3486659 | A1 * | 5/2019 | ............... B60Q 1/54 |
| JP | 1992236261 | A | 3/1994 | |
| RU | 165880 | U1 | 11/2016 | |
| WO | 2015069985 | A1 | 5/2015 | |

OTHER PUBLICATIONS

Digital Phablet, "*You Can Change The Color of New Lamborghini change color thanks to thermochromic paint*," https://www.digitalphablet.com/tech/change-color-new-laborghini-keym Aug. 15, 2020.

Hot Cars, "*A Detailed Explanation of How Color Changing Paint Works*," https://www.hotcars.com/a-detailed-explanation-of-how-color-changing-paint-works, Nov. 1, 2020.

Marquis, "*Watch A Lamborghini change color thanks to thermochromic paint*," https://www.autoblog.com/2015/07/30lamborghini-gallardo-thermochromic-paint, Jul. 30, 2015.

* cited by examiner

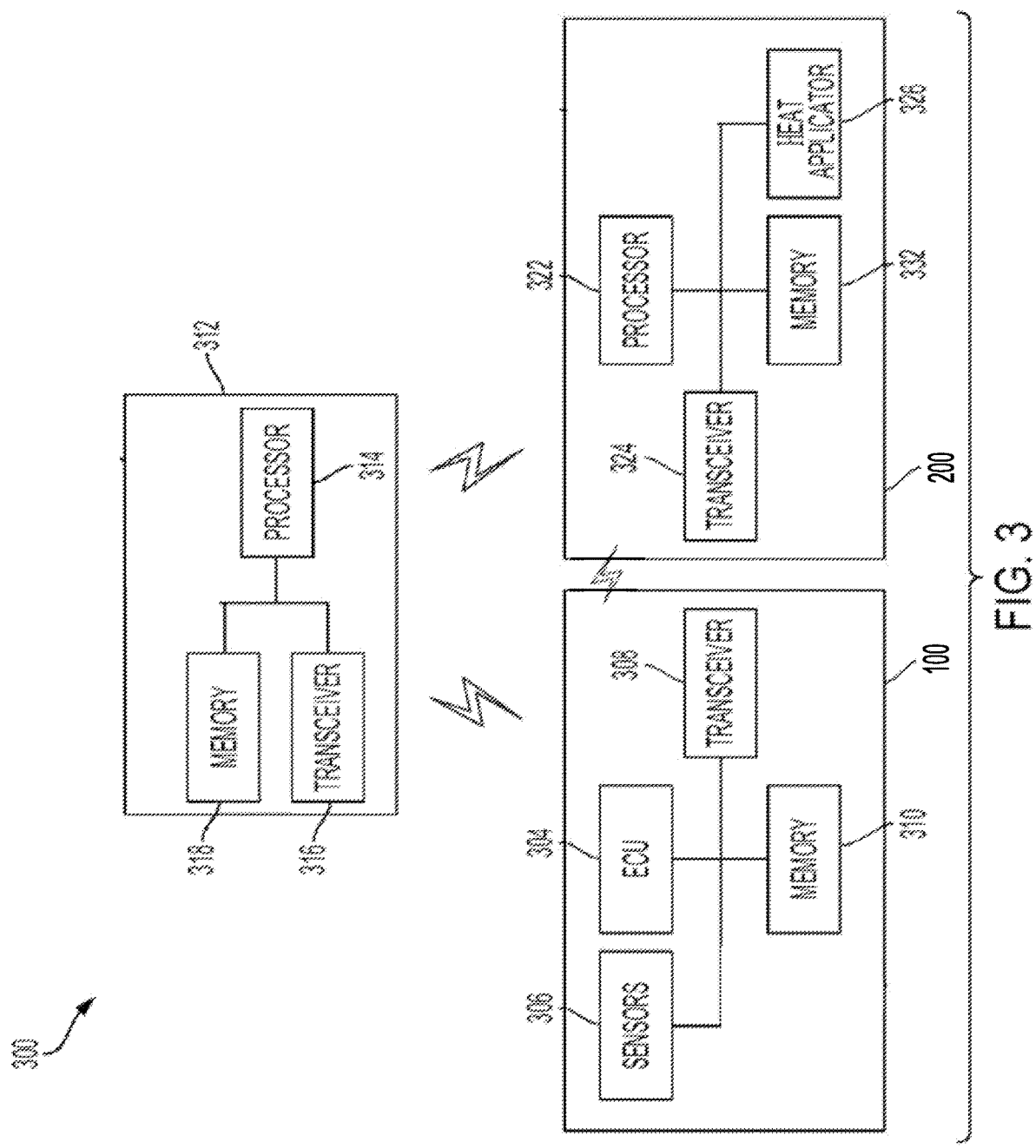

TUNABLE EXTERIOR PAINT COLOR

BACKGROUND

1. Field

This specification relates to a system and a method for improving vehicle paint of a vehicle in a particular geographic region.

2. Description of the Related Art

Vehicles, such as automobiles, may be coated with a paint. In order to change the color of the vehicle, many owners may choose to completely repaint their vehicle or get a vehicle wrap. Repainting an entire vehicle is very expensive and requires the vehicle to be in the paint shop for at least a week to perform the sanding, painting, and drying processes. A vehicle wrap is also expensive but requires less downtime. A vehicle wrap is a film applied or put on a vehicle to give the vehicle a different appearance and color. However, a vehicle wrap can be expensive and time consuming to apply or install and does not last as long as desired. In addition, vehicle colors may come and go with trends and an owner may want to change the color of the vehicle more often. Similarly, a dealership may desire to change the color of the vehicle if a certain vehicle color is difficult to sell.

Thus, there is a need in the art for systems and methods for more efficiently and easily changing the exterior paint color of a vehicle.

SUMMARY

Described herein are systems and methods that utilize thermal energy (e.g., a specific light at a certain frequency and heat level for a specific time period) which links to certain colors so all of the vehicles would be manufactured in a single color, for instance white or one given color and appearance, and changed to a specific color at the dealership before the customer purchases the vehicle. A system for modulating vehicle paint of a vehicle includes a paint layer disposed on an exterior surface of the vehicle and a color modulator configured to radiate a light at a certain frequency for a specific time period such that the paint layer reacts (i.e., changes colors) when the paint layer is exposed to the light.

Also described herein is a method for modulating vehicle paint of a vehicle. The method includes providing a paint layer on an exterior surface of the vehicle, and radiating a light such that the paint layer reacts when the paint layer is exposed to the light.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 3 illustrates a tunable color system, according to an aspect of the present disclosure.

DETAILED DESCRIPTION

Disclosed herein are systems and methods for providing a vehicle paint for a vehicle that is tunable to a particular color as desired by the dealer or the owner. Conventionally, vehicles are painted a certain color prior to being distributed and remain the same color for the life of the vehicle unless the dealership or the owner chooses to have the vehicle repainted or wrapped, for instance. Such processes can be expensive and do not provide further variety to the owner of the vehicle. As such, the systems and methods described herein provide customizable paint for customers, which reduces the need to develop and offer so many different paint color options at the factories and dealers. Using such a customizable paint also reduces or eliminates the overhead to order so many different exterior paint colors for new vehicles and prevents many vehicles from sitting on the lot for extended periods of time because the color does not appeal to a potential buyer.

For instance, the systems and methods described herein utilize thermal energy (e.g., a specific light at a certain frequency (e.g., 300 nm to 800 nm) and heat level (e.g., 40 degrees Celsius to 90 degrees Celsius) for a specific time period (e.g., 30 mins to 4 hours)) which links to certain colors so all of the vehicles would be manufactured in a single color, for instance white or one given color and appearance, and changed to a specific color at the dealership before the customer purchases the vehicle. Essentially the thermal energy changes the color from white or other base color to the customer desired color based on a list of choices available or developed.

Figure 1:
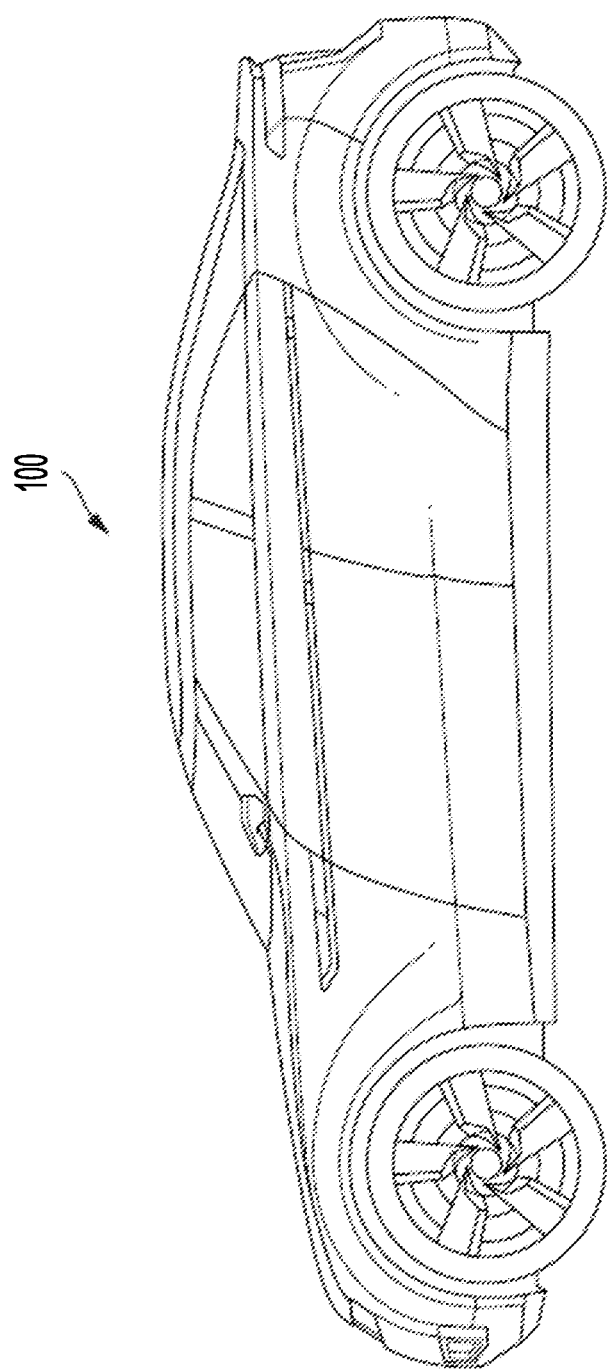
FIG. 1 illustrates a vehicle, according to an aspect of the present disclosure.

FIG. 1 illustrates a vehicle 100 to be used with a tunable color system, as described herein, according to an example embodiment. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 100 may be semi-autonomous vehicle or an autonomous vehicle. That is, the vehicle 100 may be self-maneuvering and navigate without human input. An autonomous vehicle may use one or more sensors and/or a navigation unit to drive autonomously.

The vehicle 100 may be coated with a layer of paint on an exterior surface of the vehicle 100. The layer of paint is configured to be responsive to thermal energy. For instance, when a specific light at a certain heat level is applied to the layer of paint, the paint may react and change its color. The layer of paint may be composed of aromatic rings such that the application of light and/or heat "opens" the molecule(s), which then changes what wavelengths it reflects or absorbs. The aromatic ring then recloses after the thermal energy is no longer applied. The layer of paint may appear white (e.g., an initial color) until the vehicle 100 is exposed to a source of thermal energy. In various embodiments, the initial color may be any color which is a result of a paint composition capable of responding to the thermal energy. In various embodiments, the specific light may be applied at a certain frequency, combination of frequencies, combination of different frequencies having different intensities, and the like.

Figure 2A:
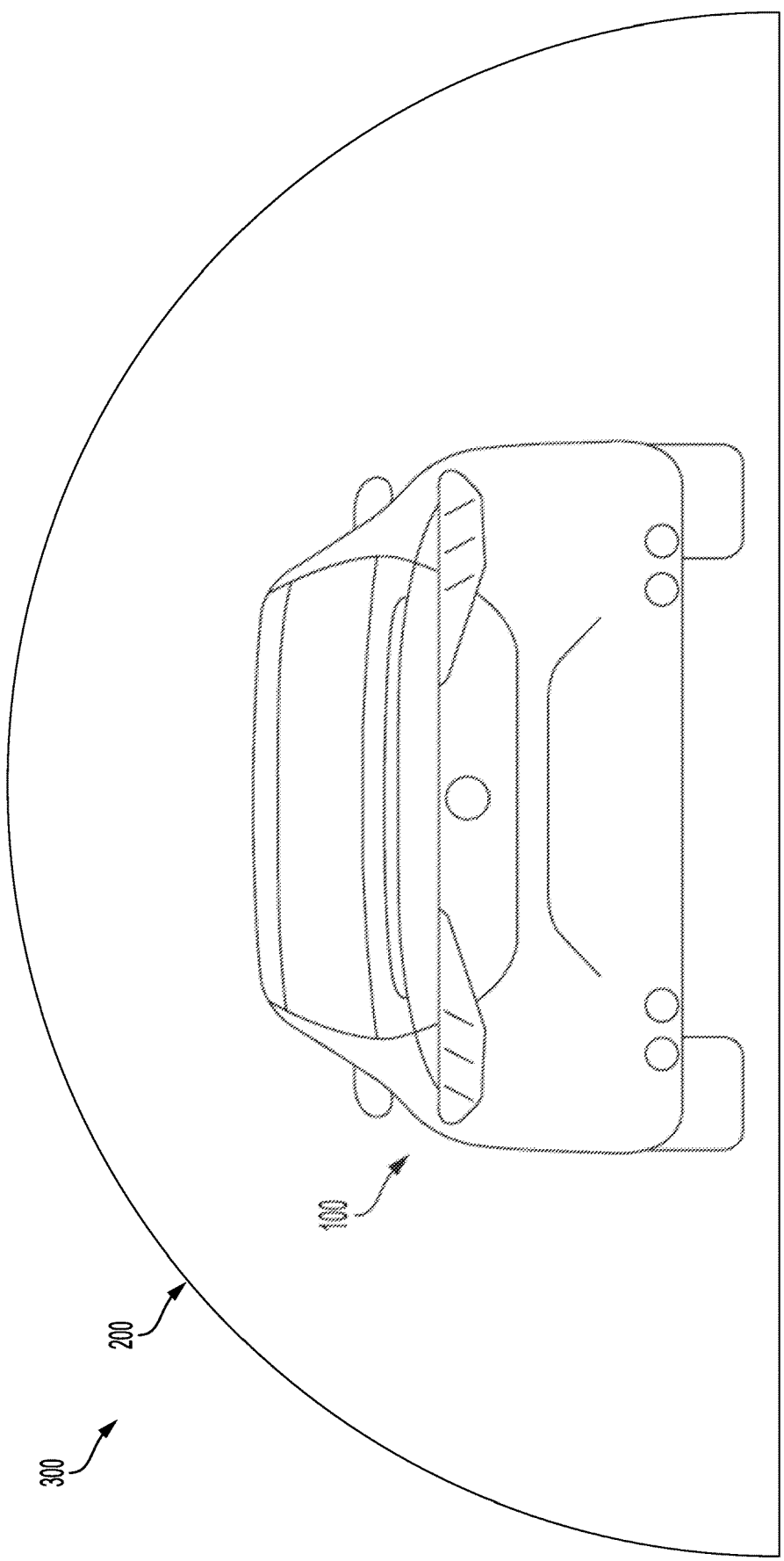
FIG. 2A illustrates a color modulator of a tunable color system, according to an aspect of the present disclosure.
Figure 2B:
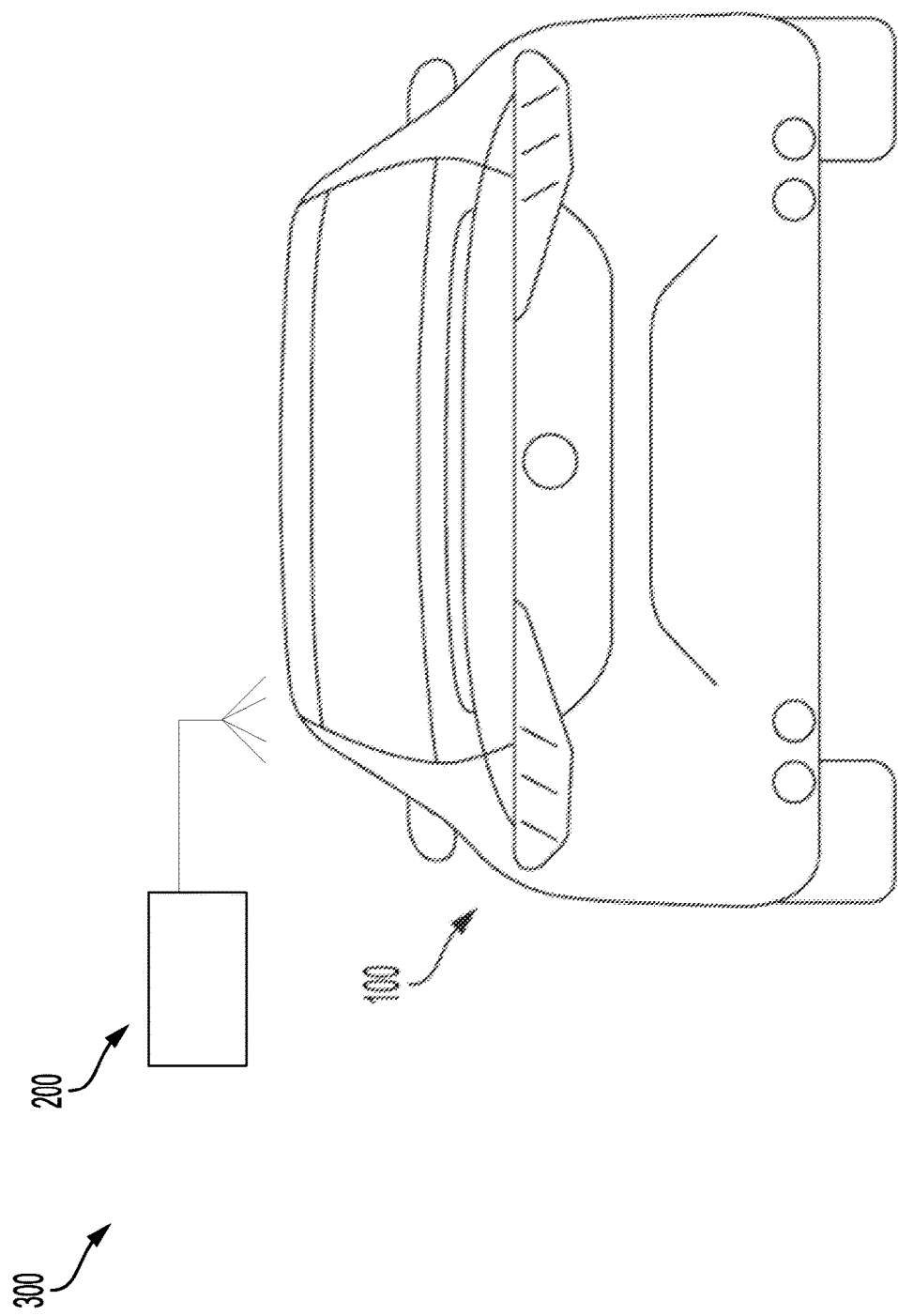
FIG. 2B illustrates a color modulator of a tunable color system, according to an aspect of the present disclosure.

Referring now briefly to FIGS. 2A and 2B, a color modulator 200 of a tunable color system 300 is illustrated, according to an example embodiment. The color modulator 200 may be configured to modulate the color of the vehicle 100. For instance, the color modulator 200 may be the source of thermal energy the layer of paint on the vehicle 100 is exposed to. In various embodiments, the color modulator 200 may be one or more energy devices located inside a bay, a garage, a tunnel, etc. with side and top walls that the vehicle 100 drives into and is positioned within (e.g., see FIG. 2A). As such, the color modulator 200 may include large surfaces (e.g., walls, mirrors, etc.) configured to illuminate and/or reflect a light configured to provide the thermal energy. In various embodiments, the color modulator 200 may include large heaters configured to heat the surrounding area to provide the thermal energy. In various embodiments, the color modulator 200 may be a portable device (e.g., handheld, movable device or heater) (e.g., see FIG. 2B). As such, the color modulator 200 may be directed by an autonomous device or robot or an operator to more precisely target the exterior surface of the vehicle 100.

FIG. 3 illustrates a block diagram of the system 300, accordingly to an example embodiment. The vehicle 100 includes an ECU 304, sensors 306, a transceiver 308, and a memory 310. All of the elements of the vehicle 100 may be connected via a communications bus. The ECU 304 may be one or more ECUs, appropriately programmed, to control one or more operations of the vehicle 100. The one or more ECUs 304 may be implemented as a single ECU or in multiple ECUs. The ECU 304 may be electrically coupled to some or all of the components of the vehicle 100 in a wired or wireless fashion. In some embodiments, the ECU 304 is a central ECU configured to control one or more operations of the vehicle 100. In some embodiments, the ECU 304 is multiple ECUs located within the vehicle and each configured to control one or more local operations of the vehicle 100. In some embodiments, the ECU 304 is one or more computer processors or controllers configured to execute instructions stored in a non-transitory memory 310.

The sensors 306 may include a temperature sensor. As described herein, the temperature sensor is configured to detect a temperature associated with the color modulator 200. The temperature sensor may be a thermometer configured to detect temperature data indicating a temperature of the air around the vehicle 100 and/or the surface temperature of an exterior surface of the vehicle 100. The sensors 306 may include a plurality of temperature sensors. For instance, the temperature sensor(s) are located on an exterior surface of the vehicle 100. The sensors 306 may be spaced apart from each other in such a manner that substantially all regions of the vehicle 100 are covered by at least one temperature sensor. In some embodiments, the sensors 306 may be retractable and driven by an actuator such that the sensors 306 may be hidden in a non-protruding manner when the temperature data is not being detected. In some embodiments, the sensors 306 remain stationary on the exterior surface of the vehicle 100 and are not retractable.

The vehicle 100 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 100 to a remote data server 312 and/or the color modulator 200.

The transceiver 308 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 308 may transmit data to and receive data from devices and systems not physically connected to the vehicle 100. For example, the ECU 304 may communicate with the remote data server 312 and/or the color modulator 200. Furthermore, the transceiver 308 may access the network, to which the remote data server 312 and/or the color modulator 200 is also connected.

The memory 310 is connected to the ECU 304 and may be connected to any other component of the vehicle 100. The memory 310 is configured to store any data described herein, such as paint data, the data received from any other sensors, and any data received from the remote data server 312 and/or the color modulator 200 via the transceiver 308.

The paint data and the temperature data, for instance, may be communicated between the system 300 and the remote data server 312 via the transceiver 308 of the system 300 and the transceiver 316 of the remote data server 312. The remote data server 312 includes a processor 314, a transceiver 316, and a memory 318, all connected to each other via a communications bus. The processor 314 (and any processors described herein) may be one or more computer processors configured to execute instructions stored on a non-transitory memory. The memory 318 may be a non-transitory memory configured to store data associated with the paint of a plurality of vehicles, such as the paint data, data received from other sensors, and data received from other inputs of the vehicle 302. The transceiver 316 may be configured to transmit and receive data, similar to the transceiver 308.

The remote data server 312 and/or the system 300 may be communicatively coupled to the color modulator 200. The remote data server 312 may be directly connected to the color modulator 200 via a data cable, or may be connected to the color modulator 200 via a network, such as a local area network or the Internet.

The paint data and the temperature data, for instance, may be communicated between the remote data server 312 and the color modulator 200 via the transceiver 316 of the remote data server 132 and the transceiver 324 of the color modulator 200. Further, the paint data and the temperature data, for instance, may be communicated between the vehicle 100 and the color modulator 200 via the transceiver 308 of the vehicle 100 and the transceiver 324 of the color modulator 200.

The color modulator 200 includes a processor 322, a memory 332, a transceiver 324, and a heat applicator 326, which may all be connected to each other via a communications bus. The processor 322 may be one or more computer processors configured to execute instructions stored on a non-transitory memory. The memory 332 may be a non-transitory memory configured to store data (e.g., the paint data). The transceiver 324 may be configured to transmit and receive data, similar to transceivers 308 and 316. In response to the paint data being received by the transceiver 324, the processor 322 may then instruct the heat applicator 326 to apply the thermal energy to the vehicle 100.

The paint data may include information associated with a desired color. For instance, a first color may require a first light at a first temperature to be applied for a first duration of time. Similarly, a second color may require a second light at a second temperature to be applied for a second duration of time; a third color may require a third light at a third temperature to be applied for a third duration of time; etc. The second temperature may be greater than the first temperature. The third temperature may be greater than the second temperature. The second duration of time may be greater than the first duration of time. The third duration of time may be greater than the second duration of time.

When a color preference is indicated (e.g., selected, commanded, etc.) (e.g., via a user interface communicatively coupled to the vehicle 100 or the color modulator 200) the processor 322 recalls the associated paint data from the memory (e.g., memory 310, 318, and/or 332) and is configured to command the heat applicator 326 to turn on. Particularly, the heat applicator 326 is instructed to generate a specific light at a certain heat level for a predetermined period of time to produce the indicated color. As such, the heat applicator 326 may turn on and generate the first light at the first temperature for the first duration of time to produce the first color. The heat applicator 326 is configured to turn off after the first duration of time passes.

In various embodiments, the transceiver 324 of the color modulator 200 communicates with the transceiver 308 of the vehicle 100 to determine when the certain heat level is achieved. The temperature sensor (e.g., sensor 306) positioned on the external surface of the vehicle 100 is configured to detect the temperature. As such, for example, if the paint data indicates that the second color results after the second light achieves the second temperature, the heat applicator 326 is configured to turn off after the sensor 306 indicates the second temperature is reached.

While only one vehicle 100 is shown, any number of vehicles may be used. Likewise, while only one remote data server 312 is shown, any number of remote data servers in communication with each other may be used. Multiple remote data servers may be used to increase the memory capacity of the data being stored across the remote data servers, and/or to increase the computing efficiency of the remote data servers by distributing the computing load across the multiple remote data servers. Multiple remote data serves may be interconnected using any type of network, or the Internet.

As used herein, a "unit" may refer to hardware components, such as one or more computer processors, controllers, or computing devices configured to execute instructions stored in a non-transitory memory.

Figure 4:
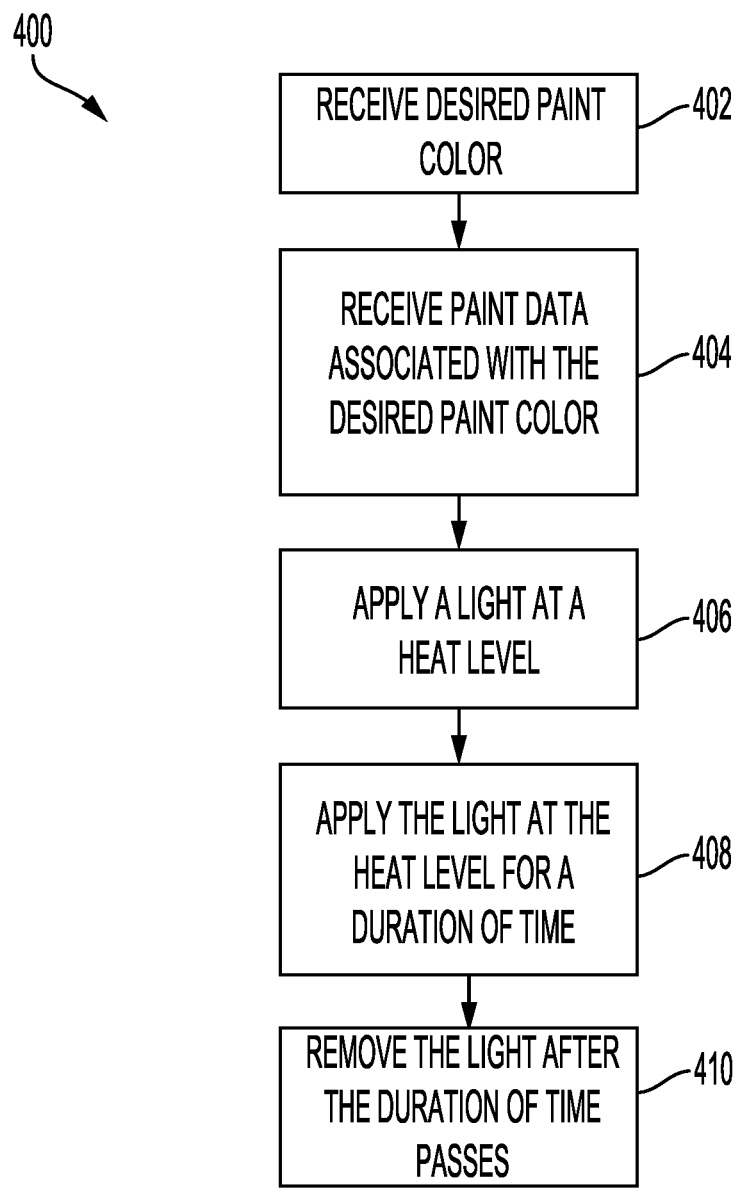
FIG. 4 is a flowchart illustrating a method for modulating vehicle paint with a tunable color system, according to an aspect of the present disclosure.

FIG. 4 is a flow diagram of a process 400 for modulating vehicle paint of a vehicle. At 402, an indication of a desired paint color is received. For instance, a transceiver of a color modulator receives a first color via a user interface of the color modulator, or from a vehicle. At 404, paint data associated with the first color is received. For instance, a processor of the color modulator may receive the paint data from a memory of the color modulator, a memory of the vehicle, or a memory of a remote device. The paint data includes instructions to the color modulator regarding a specific light at a certain heat level, and in various embodiments, a duration of time to apply the light at the heat level to trigger the color phase change in a layer of paint on the vehicle. As such, at 406, for the first color, the color modulator actuates a heat applicator to apply a first light at a first temperature. At 408, the heat applicator applies the first light at the first temperature for a first duration of time. After the first duration of time has passed, the heat applicator is turned off at 410, thus no longer exposing the paint layer to the light and the heat.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for modulating vehicle paint of a vehicle, the system comprising:
   a paint layer disposed on an exterior surface of the vehicle; and
   a color modulator including a heat applicator configured to radiate a light such that the paint layer reacts when the paint layer is exposed to the light, the color modulator is configured to:
      receive paint data associated with a first color, the paint data for the first color includes a first temperature and a first duration of time; and
      actuate the heat applicator at the first temperature for the first duration of time based on the paint data.

2. The system of claim 1, wherein the vehicle comprises:
   an electronic control unit (ECU) configured to:
      receive a user preference regarding the first color; and
      transmit the paint data associated with the user preference to the color modulator.

3. The system of claim 1, wherein the color modulator comprises:
   an electronic control unit (ECU) communicatively coupled to the heat applicator and configured to:
      receive the paint data associated with the first color; and
      actuate the heat applicator based on the paint data.

4. The system of claim 3, wherein the ECU of the color modulator is configured to actuate the heat applicator for a second color at a second temperature for a second duration of time.

5. The system of claim 4, wherein the second temperature is greater than the first temperature, and the second duration of time is greater than the first duration of time.

6. The system of claim 1, wherein the color modulator is configured to be a portable device.

7. The system of claim 1, wherein the color modulator is configured to house the vehicle.

8. The system of claim 1, further comprising a temperature sensor located on the exterior of the vehicle and configured to detect the temperature emitted from the heat applicator.

9. The system of claim 1, further comprising a remote data server configured to receive the user preference and transmit paint data based on the user preference to the color modulator.

10. The system of claim 3, wherein the color modulator further comprises a transceiver whereby the first ECU of the color modulator is configured to receive the paint data.

11. The system of claim 10, wherein the color modulator further comprises a non-transitory memory configured to store the paint data.

12. A method for modulating vehicle paint of a vehicle, the method comprising:
   providing a paint layer disposed on an exterior surface of the vehicle;
   receiving a user preference regarding a first color;

receiving paint data associated with the user preference, the paint data includes a first temperature and a first duration of time; and radiating a light with a color modulator based on the paint data such that the paint layer reacts when the paint layer is exposed to the light.

13. The method of claim 12, wherein radiating the light with the color modulator includes actuating a heat applicator at the first temperature for the first duration of time based on the paint data.

14. The method of claim 13, further comprising actuating a heat applicator based on paint data for a second color, wherein the paint data for the second color includes a second temperature and a second duration of time.

15. The method of claim 14, wherein the second temperature is greater than the first temperature, and the second duration of time is greater than the first duration of time.

16. The method of claim 13, further comprising detecting a temperature emitted from the heat applicator.

17. The method of claim 13, further comprising transmitting the paint data based on the user preference to a remote server.

18. A system for modulating vehicle paint of a vehicle, the system comprising:

a paint layer disposed on an exterior surface of the vehicle;

a color modulator configured to radiate a light such that the paint layer reacts when the paint layer is exposed to the light; and at least one of:
a temperature sensor located on the exterior of the vehicle and configured to detect the temperature emitted from the heat applicator; or
a remote data server configured to receive the user preference and transmit paint data based on the user preference to the color modulator.

\* \* \* \* \*